United States Patent [19]

Harju et al.

[11] Patent Number: 4,955,363
[45] Date of Patent: Sep. 11, 1990

[54] PROCESS OF RECOVERING LACTOSE FROM WHEY

[75] Inventors: Matti E. Harju, Nummela; Heikki O. Heikkilä, Espoo, both of Finland

[73] Assignee: Valio Meijerien Keskusosuusliike, Helsinki, Finland

[21] Appl. No.: 256,600

[22] Filed: Oct. 12, 1988

[30] Foreign Application Priority Data

Oct. 14, 1987 [FI] Finland ................... 874535

[51] Int. Cl.$^5$ ................... C13F 1/04; C13F 1/12; C13D 3/14; C13D 3/16
[52] U.S. Cl. ................... 127/46.1; 127/46.2; 127/46.3; 127/48; 127/55; 127/56; 127/58; 127/61; 127/31; 530/417; 530/419; 530/366; 426/271
[58] Field of Search ............ 127/46.1, 46.2, 46.3, 127/48, 55, 56, 58, 61, 31; 530/417, 419, 366; 426/271

[56] References Cited

U.S. PATENT DOCUMENTS

| | | | |
|---|---|---|---|
| 2,116,931 | 3/1938 | Leviton | 127/31 |
| 2,778,750 | 1/1957 | Hull | 127/31 |
| 4,316,749 | 2/1982 | Evans et al. | 127/55 |
| 4,820,348 | 4/1989 | Harju | 127/46.2 |

FOREIGN PATENT DOCUMENTS

| | | | |
|---|---|---|---|
| 0311977 | 4/1989 | European Pat. Off. | 127/31 |
| 1430490 | 3/1976 | United Kingdom . | |

OTHER PUBLICATIONS

Von E. Berghofer and A. Scheibl-Technishće Fraktionierung von Molke durch Lonenaustaucher--Chromatographie. I. Literaturübersicht, pp. 700–703.
Von E. Berghofer and A. Scheibl-Technische Fraktionierung von Molke durch Lonenaustauscher--Chromatographic, II, Versuche, pp. 774–779.

Primary Examiner—Chung K. Pak
Attorney, Agent, or Firm—Brumbaugh, Graves, Donohue & Raymond

[57] ABSTRACT

A method of recovering lactose from milk whey or cheese whey with a high yield, wherein the whey is concentrated, part of the lactose is crystallized, and the crystals are separated and dried; the mother liquor is purified by heating it to about 60° to 70° C. at a pH of about 5.8 to 7.0 and by removing the resultant precipitate by centrifugation; the purified mother liquor is fractionated chromatographically, using sulphonated polystyrene resin which is in sodium ion form and crosslinked by a 3–6% per weight divinylbenzene and which is even-grained, the flow rate is about 0.4 to 1.5 m$^3$/h, the temperature about 50° to 75° C., and the pH about 5.5 to 7; whereafter elution is carried out with water, and the following fractions are recovered: a protein fraction which may also contain salts, an intermediate fraction which is recirculated to the fractionating step, and a lactose fraction which is passed to the crystallization step.

6 Claims, 3 Drawing Sheets

FIG. 4
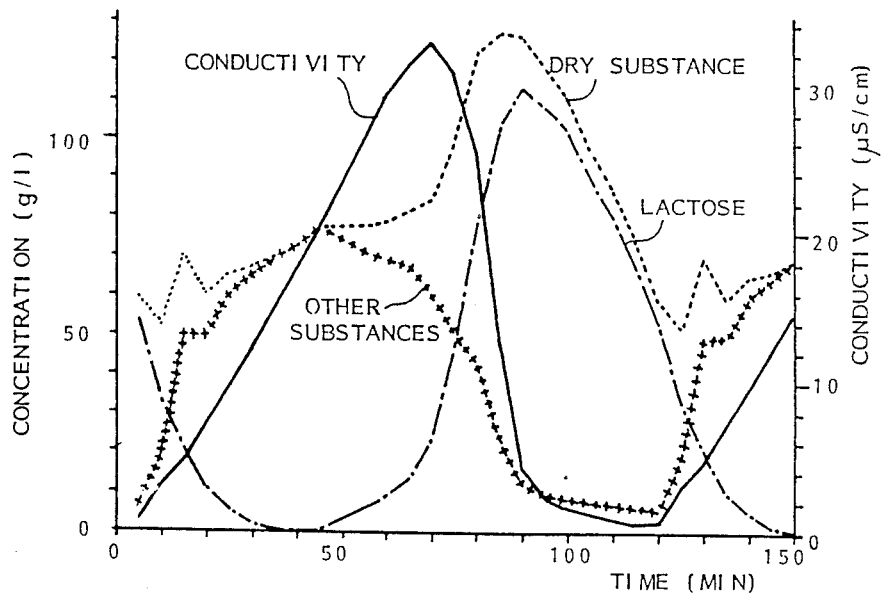
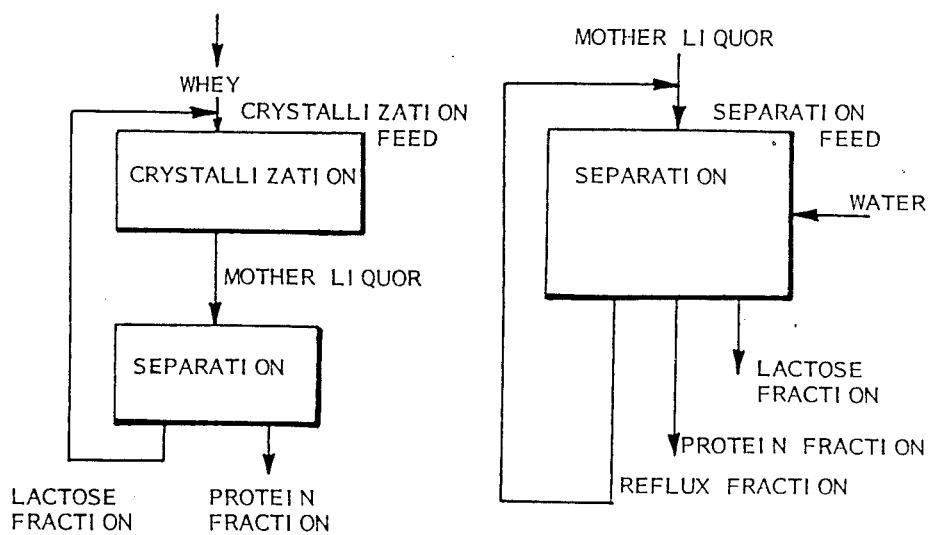
FIG. 5
FIG. 6

PROCESS OF RECOVERING LACTOSE FROM WHEY

BACKGROUND OF THE INVENTION

This invention relates to a process of recovering lactose from milk whey or cheese whey with a good yield. The process according to the invention is characterized by the steps of concentrating whey, crystallizing part of the lactose, and separating and drying the crystals; purifying the mother liquor by separating calcium, fat and proteins, fractionating the purified mother liquor chromatographically, eluting with water, and recovering the following fractions: protein fraction, also containing salts, intermediate fraction which is recirculated to the fractionating step, and a lactose fraction which is passed to the crystallizing step, and possibly a dilute lactose fraction which is recirculated to the fractionating step.

Milk whey is the most important raw-material source of lactose. Lactose can be crystallized directly from whey, in which case the yield, however, is rather poor and the degree of purity of the lactose is low. Various processes have been developed for improving the yield and quality of lactose; these are summarized in Milchwissenschaft 1986, p. 700–703 and 774–779.

In general, the object has been to provide a process in which both the proteins and lactose contained in whey are recovered. A problem has been that in the crystallization a major part of the lactose remains in the mother liquor, from which lactose is difficult to recover. Mother liquor is thus a waste product without any significant use.

British Patent Specification No. 1,430,490 discloses a process for chromatographically separating whey. The process utilizes a cation exchange resin in calcium form and three fractions are recovered: a protein fraction, lactose fraction and calcium lactate fraction. An intermediate fraction can be taken from between the lactose fraction and the calcium lactate fraction and recirculated.

However, the recovery of pure lactose by this prior process is difficult, because the lactose fraction is positioned between and partly under the other two fractions. In addition, the amount of liquid to be treated is large, which makes the process difficult to carry out.

Particularly problematic are wheys containing relatively plenty of calcium, such as whey obtained in the production of Edam cheese. In the separation of whey, calcium concentrates in the mother liquor, the calcium content of which rises even up to 0.5%. Such a high calcium content together with a low pH causes precipitation in the chromatographic separation columns, thus resulting in a greater need of regeneration. Since the pH of the solution typically drops during the chromatographic separation, conditions in the column become such that certain proteins (such as lactalbumin and lactoglobulin) are also precipitated.

BRIEF DESCRIPTION OF THE DRAWINGS

FIGS 5 and 6 show flow diagrams in accordance with the invention.

SUMMARY OF THE INVENTION

An improved process has now been developed for the recovery of lactose from whey. In the new process, a major part of the lactose is crystallized first, and the mother liquor is subjected to chromatographic separation. In this way, pure lactose can be produced with an extremely high yield and a high separation capacity.

DETAILED DESCRIPTION OF THE INVENTION

The process according to the invention is characterized by the steps of (a) concentrating whey;

(b) crystallizing part of the lactose, and separating and drying the crystals;

(c) purifying the mother liquor by heating it to about 60°- to 70° C. at a pH of about 5.8 to 7.0, and by removing the resultant precipitate by centrifugation, whereafter a further filtration is carried out if necessary;

(d) chromatographically fractionating the purified mother liquor, using sulphonated polystyrene resin which is in sodium ion form and cross-linked by a 3–6% by weight divinylbenzene and which is evengrained, the average grain size being about 0.2 to 1 mm; the flow rate is about 0.4 to 1.5 $m^3/h$, the temperature about 50 to 75° C., and the pH about 5.5 to 7; whereafter elution is carried out with water; and (e) recovering at least the following fractions:

(1) a protein fraction which may also contain salts, (2) an intermediate fraction which is recirculated to the fractionating step d), and (3) a lactose fraction which is passed to the crystallization step s).

Figure 1:
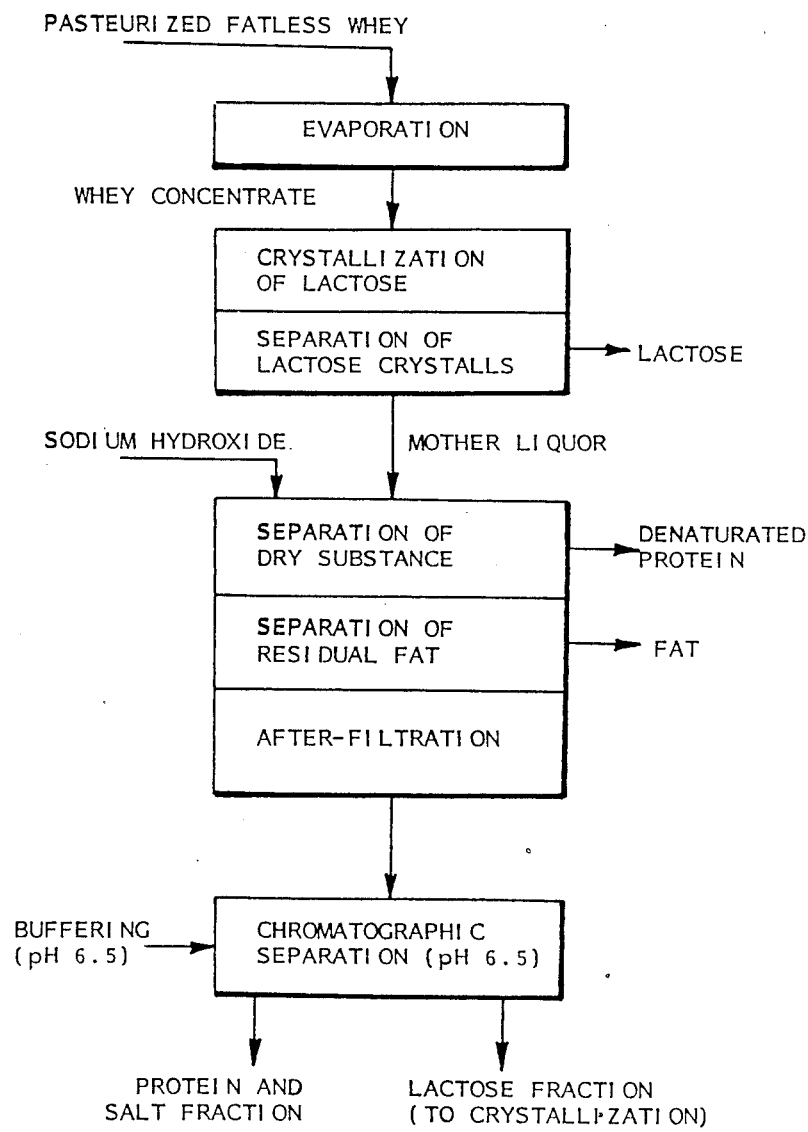
FIG. 1 is a flow diagram for a process according to the invention.

The flow diagrams are shown in FIGS. 1, 4 and 5.

A major part of the lactose contained in whey is crystallized by a process known per se, and crystals are separated from the solution e.g. by means of a decanter centrifuge. The pH of the remaining solution is adjusted to range from 5.8 to 7.0, preferably by sodium hydroxide. The solution is heated to 6070° C. and centrifuged by a purifying centrifuge (Westfalia MSB or the like). A small amount of calcium-containing protein precipitate is removed in the centrifugation.

After centrifugation the solution is subjected to chromatographic separation. In the separation a sulphonated polystyrene divinylbenzene resin having a degree of cross linking of 3 to 6% is used. The pH of the solution is adjusted to a value from 6 to 7 (optimum 6.5 to 6.8). The resin should be in alkali metal-ion form, preferably in sodium form.

Prior to the chromatographic separation, if required, calcium and certain easily precipitating proteins as well as fats are removed in the following way: the solution is heated to a separation temperature or to a temperature slightly above it, and the pH is adjusted to a value from 5.8 to 7.0, whereafter the solution is clarified by means of centrifuges. Calcium is thus removed as calcium phosphate and a small aliquot of the proteins and the fats are removed together with the precipitate. Thereafter, a chromatographic separation can be carried out with a high yield.

In the chromatographic separation a batch-wise process or a continuous process can be used.

The following examples are illustrative of the invention.

EXAMPLE 1

(a) Crystallization

Most of the lactose contained in whey obtained from the production of Edam cheese (0.7% of protein, 4.5% of lactose and 0.04% of calcium) was crystallized in the following way:

Whey (10,000 kg) from cheese kettles was pasteurized (75° C., 15 s) and separated for the recovery of residual fat. The separator was of a self-cleaning type by means of which cheese dust, too, could be removed. After separation the fat content of the whey was 0.07%. The whey was then evaporated with a fourstage falling-film evaporator (maximum temperature 75° C.) to a dry content of 58%. The whey concentrate (990 kg) was pumped without cooling into a crystallization tank comprising a cooling jacket and a scraping agitator. The whey concentrate was cooled in the tank with lake water (10° C.) by about 2° C. per hour until the temperature was 15° C. Thereafter the crystallized whey concentrate was pumped into a decanter centrifuge which separated the lactose crystal mass and the mother liquor. The mother liquor (dry content 35%) was pumped into an intermediate storage container. The crystal mass was diluted with water and pumped into a second decanter centrifuge. The mother liquor from the second centrifugation (dry content 15%) was pumped into the same intermediate storage container, and the crystal mass was passed into a fluidized-bed drier in which it was dried into lactose powder.

The flow diagram is shown in FIG. 1.

The substance balance was as follows:

| Pasteurized, fatless whey; 10,000 kg | 584 kg d.s. |
| --- | --- |
|  | 440 kg lactose |
|  | 78 kg protein |
|  | 52 kg ashes |
| Whey concentrate; 986 kg | 572 kg d.s. |
|  | 432 kg lactose |
| 83 | 75 kg protein |
| Lactose | 51 kg ashes |
|  | 270 kg d.s. |
|  | 268.5 kg lactose (anhydrous) |
|  | 1.0 kg protein |
|  | 0.5 kg ashes |
| Mother liquor | 290 kg d.s. |
|  | 156 kg lactose |
|  | 72.5 kg protein |
|  | 49.5 kg ashes |

The lactose yield was thereby about 61%.

(b) Purification of the mother liquor

The pH of the mother liquor (1,036 kg) was adjusted to a value 6.5 by a sodium hydroxide solution (10%, 8.0 kg). The solution was heated to 65° C. and passed into a purifying centrifuge (Westfalia MSB 1406-076, rate of rotation 7570 r/min and flow-through rate 1,000 l/h). Precipitate was emptied at intervals of two minutes. Before the solution was fed into a chromatographic column, an after-filtration was carried out by means of a GAF bag filter. Part of the solution was cooled to 15° C. and kept at this temperature until it was reheated to 65° C. before chromatographic separation.

Table 1 shows the composition of the mother liquor before and after centrifugation and the composition of the precipitate obtained.

EXAMPLE 2

Lactose was crystallized from whey contained in Emmental cheese similarly as described in Example 1. The calcium content of the obtained mother liquor was 0.3%. The solution was treated similarly as in Example 1; however, because the amount of precipitate obtained was smaller, the precipitate was emptied from the centrifuge at longer intervals of 5 minutes. The amount of the precipitate solution was 10% on the amount of the feed solution, and the calcium content of the purified solution was 0.15%. Before chromatographic separation, an after-filtration was carried out by means of a 20 μm PALL bag filter.

EXAMPLE 3

Lactose was crystallized from whey formed in the production of caseine and curd cheese. The mother liquor thereby contained 0.7% of calcium. The mother liquor was subjected to the same treatment as in Example 1, which resulted in a solution having a calcium content 0.2%. The solution was filtered through a bag filter similarly as in Example 1 and a chromatographic separation was carried out.

EXAMPLE 4

When whey obtained from the production of cheese was ultrafiltered before the crystallization of lactose, the protein content of the obtained mother liquor was very low. This mother liquor was pretreated similarly as in Example 1, whereafter a chromatographic separation was carried out. In this way, 90% of the lactose was recovered to be recirculated to the crystallization step.

EXAMPLE 5

The process and the apparatus were the same as in Example 1. The whey was treated similarly as in Example 1.

| Separation conditions: | |
| --- | --- |
| Column diameter: | 0.225 m |
| Resin: | sulphonated polystyrene (4.5% divinylbenzene) in Na+ form grain size 0.36 mm |
| Height of resin layer | 5.1 m |
| Feed: | 0.04 m³/h (total 7 kg; 29 g/100 ml) |
| Composition of the feed solution: | |
| Lactose | 49.4% |
| Proteins and salts | 50.0% |
| Others | 0.6% on dry substance |
| pH: | 6.7 |
| Temperature | 65° C. |
| Eluent: | water, 0.04 m³/h |

Figure 2:
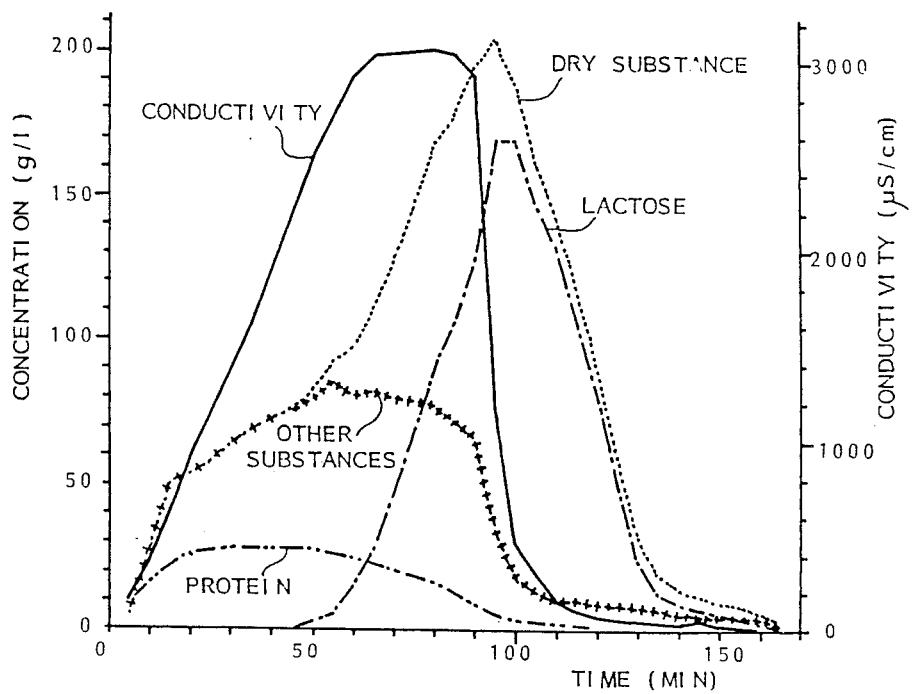
FIGS. 2 and 3 depict the chromatographic fractionation behavior of various samples during the process of the invention.

Fractionation is shown in FIG. 2. Three fractions were recovered.

| Fraction No. | 1 | 2 | 3 |
| --- | --- | --- | --- |
| Fraction limits (min) | 72 | 82 | 120 |
| Dry substance | | | |
| Amount (kg) | 3.26 | 0.76 | 2.51 |
| Concentration (g/100 g) | 7.1 | 11.2 | 9.6 |
| Composition (% on dry substance) | | | |
| Lactose | 14.9 | 63.4 | 90.1 |

-continued

| Fraction No. | 1 | 2 | 3 |
|---|---|---|---|
| Protein } Salts | 84.6 | 35.4 | 9.4 |
| Others | 0.48 | 1.20 | 0.5 |

Fraction no 1 is rich in protein and fraction no 3 is a lactose fraction. The lactose fraction was passed to the crystallization step. Fraction 2 was recirculated to the separation step.

EXAMPLE 6

The apparatus and the resin were the same as in Example 1. Whey was treated as in Example 1.

| Separation conditions: | |
|---|---|
| Column diameter: | 0.225 m |
| Resin: | sulphonated polystyrene (4.5% divinylbenzene) in Na$^+$ form grain size 0.36 mm |
| Height of resin layer: | 5.0 m |
| Feed: | 0.04 m$^3$/h (total 30 l;28.8 g/100 ml) |
| pH: | 6.7 |
| Temperature: | 65° C. |
| Eluent: | water, 0.04 m$^3$/h |
| Composition of the feed solution: | |
| Lactose | 50.4% |
| Proteins | 14.7% |
| Salts | 34.2% |
| Others | 0.7% on dry substance |

Figure 3:
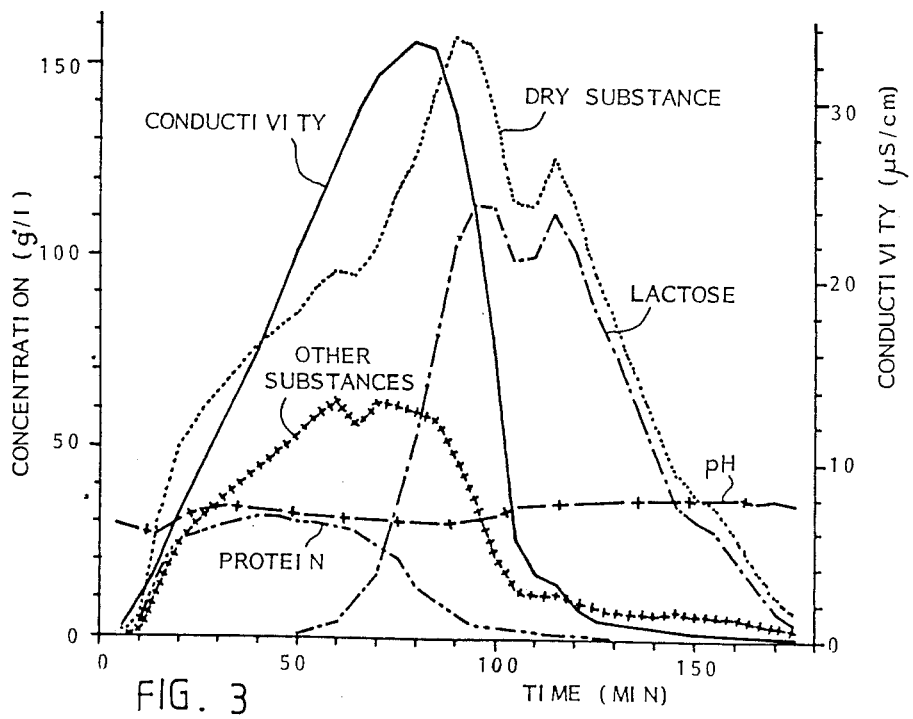

Fractionation is shown in FIG. 3. Four fractions were recovered.

| Fraction No. | 1 | 2 | 3 | 4 |
|---|---|---|---|---|
| Fraction limits (min) | 74.5 | 105 | 136.5 | 145 |
| Dry substance | | | | |
| Amount (kg) | 3.28 | 2.8 | 2.1 | 0.3 |
| Concentration (g/100 g) | 8.6 | 13.2 | 9.5 | 5.1 |
| Composition (% on dry substance) | | | | |
| Lactose | 15.0 | 66.2 | 89.8 | 79.4 |
| Protein Salts | 53.7 | 28.4 | 8.9 | 16 |
| Others | 0.58 | 0.90 | 0.56 | 0.41 |

Fraction no 1 is rich in protein and fraction no 3 is a lactose fraction. The lactose fraction was passed to the crystallization step. Fraction 2 was recirculated to the separation step.

Example 7

The test conditions were the same as in Example 1. Successive feeds were introduced into the column at intervals of 110 min. The following fractions were recovered from the solution discharged from the column: protein fraction (1), recirculation fraction (2), lactose fraction (3) and another recirculation fraction (4). The compositions of the fractions were as follows:

| Fraction No. | 1 | 2 | 3 | 4 |
|---|---|---|---|---|
| Dry substance | | | | |
| Amount (kg) | 3.67 | 0.14 | 5.17 | 0.18 |
| Concentration (g/100 g) | 9.2 | 14.0 | 15.2 | 10.5 |
| Composition (% on dry substance) | | | | |
| Lactose | 18.5 | 46.1 | 75.0 | 46.1 |
| Protein | 27.6 | 12.5 | 5.7 | 20.9 |

The lactose fraction was passed to lactose crystallization, and the protein fraction was used as fodder.

EXAMPLE 7 b

The conditions were the same as in Example 7, but the solution obtained from the separation was divided into 5 fractions as follows: protein fraction (1), salt fraction (2), recirculation fraction (3), lactose fraction (4), and another recirculation fraction (5).

| Fraction No. | 1 | 2 | 3 | 4 | 5 |
|---|---|---|---|---|---|
| Fraction limits (min) | 40 | 70 | 74.5 | 122.5 | 125 |
| Dry substance | | | | | |
| Amount (kg) | 1.35 | 2.02 | 0.44 | 5.17 | 0.18 |
| Concentration (g/100 g) | 7.9 | 9.7 | 14.0 | 15.2 | 10.5 |
| Composition (% on dry substance) | | | | | |
| Lactose | 14.2 | 17.3 | 46.1 | 75 | 46.1 |
| Protein | 34.8 | 25.1 | 12.5 | 5.4 | 20.9 |
| Salt and other substances | 51.0 | 57.6 | 41.4 | 19.6 | 33.0 |

Example 8

The test conditions were the same as in Examples 1 and 7. 9 successive separations were carried out for obtaining a state of equilibration. The lactose fractions were recirculated to the crystallization. The protein fractions were recovered to be used as fodder.

The flow diagram in shown in FIG. 4.

Table 2 shows the result of the separation. 75% of the lactose was recovered to the lactose fraction. The total yield was 92.5% when the recirculation of the intermediate fractions was used.

EXAMPLE 9

The test conditions were the same as in Examples 1 and 7. The flow diagram is shown in FIG. 5. Table 3 shows the fractionation of lactose and protein. The total yield was 81% of the lactose.

EXAMPLE 10

The test conditions were the same as in Example 1. FIG. 6 shows the flow diagram when recirculation is applied in the separation.

TABLE 1

The composition (%) of the mother liquor before and after centrifugation, and the composition (%) of the resultant precipitate

| | Mother liquor | After centrifugation | Precipitate |
|---|---|---|---|
| Dry substance | 28.0 | 27.4 | 29.7 |
| Protein | 7.0 | 6.3 | 9.2 |
| Ashes | 4.8 | 4.5 | 5.6 |
| Calcium | 0.41 | 0.25 | 0.89 |

TABLE 2

Fractionation of protein and lactose

|  | Whey | Crystallization feed | Mother liquor | Protein fraction | Lactose fraction |
| --- | --- | --- | --- | --- | --- |
| Dry substance | | | | | |
| Amount (kg) | 108 | 150 | 75 | 33 | 42 |
| Concentration (g/100 g) | 6 | | 30 | 8 | 13 |
| Amount of solution (kg) | 1800 | | 250 | 414 | 322 |
| Composition | | | | | |
| Lactose | | | | | |
| (kg) | 81 | 112 | 38 | 6 | 31 |
| (%) | 75 | 75 | 50 | 18 | 75 |
| Protein | | | | | |
| (kg) | 18 | 18 | 18 | 18 | 0.4 |
| (%) | 16 | | 24 | 43 | 1 |

TABLE 3

Fractionation of protein and lactose

|  | Mother liquor | Separation feed | Lactose fraction | Protein fraction | Recirculation |
| --- | --- | --- | --- | --- | --- |
| Dry substance | | | | | |
| Amount (kg) | 75 | 78 | 42 | 33 | 30 |
| Concentration (g/100 g) | 30 | 25 | 13 | 8 | 5 |
| Amount of solution (kg) | 250 | 310 | 332 | 414 | 600 |
| Composition | | | | | |
| Lactose | | | | | |
| (kg) | 38 | 38 | 31 | 6 | 5 |
| (%) | 50 | 49 | 75 | 18 | 18 |
| Protein | | | | | |
| (kg) | 18 | 19 | 0.4 | 18 | 9 |
| (%) | 24 | 24 | 1 | 43 | 30 |

We claim:

1. A method of recovering lactose from milk whey or cheese whey comprising the steps of
   (a) concentrating the whey;
   (b) crystallizing part of the lactose in the whey;
   (c) separating the resulting lactose crystals from the resulting mother liquor;
   (d) drying the lactose crystals;
   (e) adjusting the pH of the mother liquor to about 5.8 to 7.9;
   (f) heating the pH-adjusted mother liquor to about 60 to 70° C. whereby a precipitate is formed;
   (g) removing the precipitate by centrifuging the heated mother liquor and decanting the resulting supernatant to recover a purified mother liquor;
   (h) chromatographically fractionating the purified mother liquor at a temperature of about 50 to 75° C., and a pH of about 5.5 to 7 using sulphonated polystyrene resin which is in sodium ion form and cross-linked by a 3-6% by weight divinylbenzene and which is even-grained, the average grain size being about 0.2 to 1 mm; the flow rate of the purified mother liquor being about 0.4 to 1.5 $m^3/h$, whereafter elution is carried out with water; and
   (i) recovering at least the following fractions;
      (1) a protein fraction, fractions;
      (2) an intermediate fraction comprising lactose and other impurities which is recirculated to the fractionating step (h), and
      (3) a lactose fraction which is passed to the crystallization step (b).

2. A method according to claim 1, further comprising the steps of:
   (a) concentrating the whey to a dry content of about 60%;
   (b) crystallizing part of the lactose in the whey wherein the temperature being dropped from about 70° C. to about 15° C in about 30 hours.

3. A method according to claim 1 wherein the purified mother liquor may be further purified by filtration prior to chromatographic filtration.

4. A method according to claim 1 wherein said protein fraction contains salts.

5. A method according to claim 1 wherein the purified mother liquor is further purified by filtration prior to chromatographic filtration.

6. A method according to claim 2 wherein said protein fraction contains salts.

* * * * *

UNITED STATES PATENT AND TRADEMARK OFFICE
CERTIFICATE OF CORRECTION

PATENT NO. : 4,955,363
DATED : Sept. 11, 1990
INVENTOR(S) : Harju et al.

It is certified that error appears in the above-identified patent and that said Letters Patent is hereby corrected as shown below:

Col. 2, line 42, "6070° C." should read --60-70° C.--.
Col. 3, line 42, delete "83"; line 58, "1406-076" should read --14-06-076--. Col. 6, line 49, "FIG. 5" should read --FIG. 6-- line 55, "FIG. 6" should read --FIG. 5--. Col. 8, line 5, "7.9" should read --7.0--; line 21, delete "fractions;"; line 23, delete "other"; line 35, "may be" should read --is--; line 39, "claim 1" should read --claim 2--.

Signed and Sealed this

Twelfth Day of May, 1992

Attest:

DOUGLAS B. COMER

Attesting Officer

Acting Commissioner of Patents and Trademarks